Nov. 24, 1936.  G. M. DEMING  2,061,794

PRESSURE REGULATOR

Filed March 15, 1933

INVENTOR
George M. Deming
BY
ATTORNEY

Patented Nov. 24, 1936

2,061,794

UNITED STATES PATENT OFFICE 2,061,794

PRESSURE REGULATOR

George M. Deming, East Orange, N. J., assignor to Air Reduction Company, Incorporated, New York, N. Y., a corporation of New York Application March 15, 1933, Serial No. 660,817

7 Claims. (Cl. 50—23)

This invention relates to the art of gas pressure regulators, and particularly to regulators having rubber diaphragms.

Objects of the invention are to retain the advantages of the rubber diaphragm for pressure regulation, and to provide a construction involving a rubber diaphragm and metal diaphragm plate, which both insures gas tightness and prevents displacement of the diaphragm plate, which is simple and inexpensive and compact, and which is durable and results in high quality of regulation.

Figure 1:
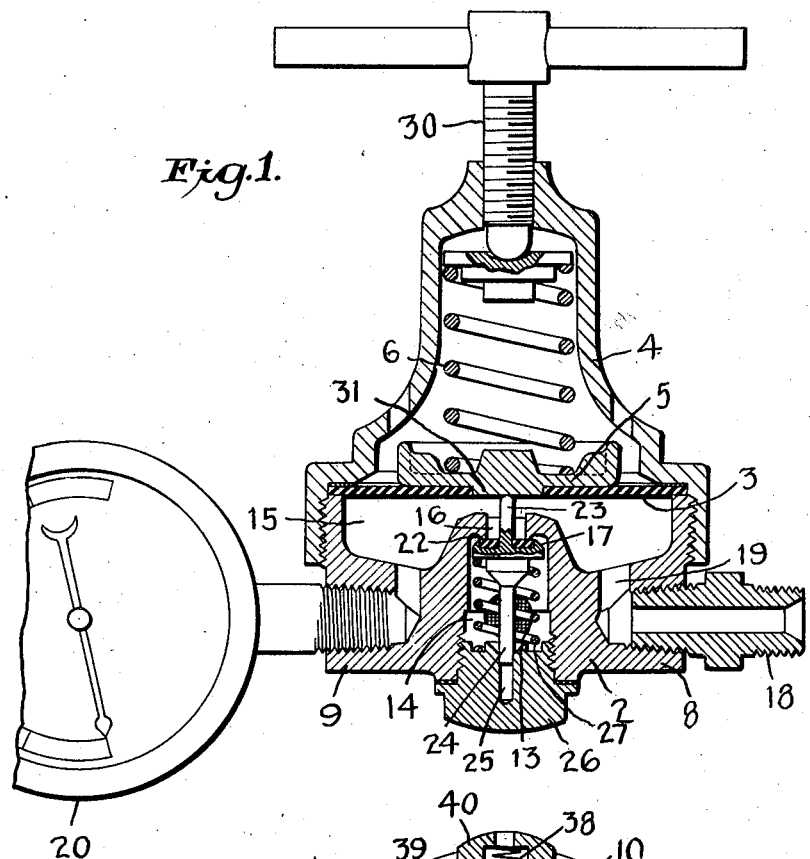
Figure 2:
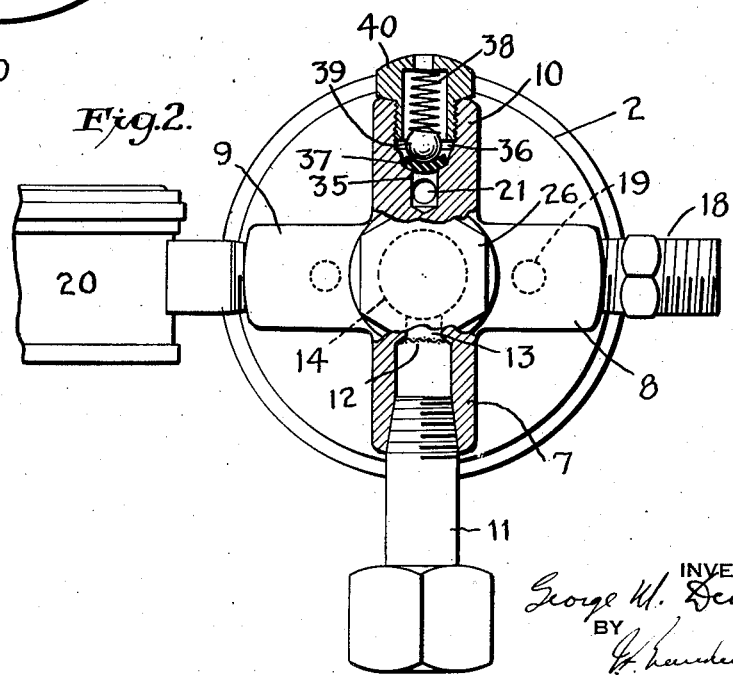

In the accompanying drawing, forming part hereof:

Fig. 1 is a section through a regulator embodying the invention, the plane of the section being normal to the diaphragm; and Fig. 2 is a view that may be termed a bottom plan with portions broken away and in section.

The illustrated regulator has a body 2, a rubber diaphragm 3 and a spring case 4 screwed onto the body, the margin of the diaphragm being clamped between the body and the spring case. Behind or above the diaphragm there is a metal plate 5, termed a diaphragm plate, against which the regulator spring 6 bears. The diaphragm plate, it should be understood, is not merely a seat for the regulator spring or a protector for the diaphragm, but is a very important functioning part in securing good regulation, as is evidenced by the fact that for a given set of factors or requirements there is an area of plate that will give the best results.

The body has radial hollow bosses 7, 8 and 9. The boss 7 receives the inlet connection 11. The gas thus admitted passes a screen filter 12 and enters, through opening 13, a central high pressure chamber 14. Connecting this chamber and the reduced pressure chamber 15 beneath the diaphragm is a passage or orifice 16, which is commanded by a valve element 17 under the control of the diaphragm and the regulator spring. The delivery connection 18, in the boss 8, communicates with the reduced pressure chamber 15 through an opening 19. A pressure gauge 20 is connected with the boss 9, in communication with the reduced pressure chamber 15.

The valve element 17 is preferably of the type presenting a flat seating surface to an annular lip 22 projecting from around the orifice 16.

It may be stated here, that with reference to the direction in which the valve element closes in relation to the higher gas pressure, there are two types of regulators. In the regulators of one type, which have been termed direct type regulators, the valve element closes against the high pressure, that is to say against the outlet of the orifice connecting the high and low pressure chambers. In those regulators of this class in which the valve means is not fastened to the diaphragm, the valve element is constantly urged by a spring, termed a compensating spring, in the closing direction, whereas the regulator spring seeks to open the valve, this action of the regulator spring being opposed by the gas pressure in the reduced pressure chamber acting against the diaphragm. In regulators of the so-called inverse type, the valve closes in the direction in which the high pressure acts. It is customary in such regulators to provide a so-called marginal spring constantly urging the valve in the closing direction. As in the direct-type regulators, the regulator spring opens or increases the clearance at the valve whenever the reduced gas pressure starts to decline.

Features of the present invention have to do with the diaphragm, the diaphragm plate and the manner in which these parts coact with the valve element, or with a member connected with the valve element. This feature combines advantageously with the simple inverse type mechanism in which a central pin projects from the valve element through the valve orifice to bear against the diaphragm or against a part associated with the diaphragm. In a broader aspect, however, the utility of the novel features is not confined to the inverse type of regulator, and consequently the drawing, which shows an inverse type regulator, is to be considered as being primarily illustrative.

Accordingly, the valve element 17 is shown located in the high pressure chamber 14, and the lip or fixed seat 22 with which it coacts is at the inlet or high pressure side of the orifice 16. The pin 23 which projects through the orifice to coact with the diaphragm and diaphragm plate, to receive the force of the regulator spring 6, may be integral with the body of the valve element, and this element may be guided by a pin 24 projecting in the opposite direction to cooperate with a guide bore 25 in a back plug 26. 27 is the so-called marginal spring.

It has already been stated that the diaphragm 3 is a rubber diaphragm. For gas pressure regulation rubber diaphragms have valuable properties as compared with metal diaphragms.

Advantages of rubber diaphragms in pressure regulators may be listed as follows:

(1) A high degree of flexibility which permits;

(a) The design of a compensating spring that is not so stiff that it will exert an excessive stress for a new seat or permit the compensating stress to fall away too rapidly with increasing seat indentation.

(b) The use of a smaller diaphragm and regulator body for a given quality of regulation.

(c) Full advantage to be take of an adjusting spring of low stiffness.

(2) A readily renewable diaphragm joint; i. e., one that does not require a soldering operation or the use of a special sealing gasket.

(3) A highly leak-proof joint at the juncture of the diaphragm and the regulator body.

(4) A diaphragm that will not crack as a result of repeated stresses. By this invention the advantages of the rubber diaphragm are kept without some disadvantages that have attended its use in these pressure regulators.

For certain kinds of service, regulators are so constructed that a transmission element (a lever or a stirrup in the case of a direct type regulator) has a large head or bearing surface to bear against the diaphragm. If the bearing surface is of considerable extent, it is permissible for this metal part to bear on the rubber of the diaphragm. The diaphragm may then be imperforate, but with the diaphragm plate unfastened to the diaphragm some means should be provided for keeping the diaphragm plate centered, this for either of two reasons, one being to keep the diaphragm plate from rubbing against the case, if the plate is of large diameter as it should be in most instances to give best fundamental regulation, the other being to prevent canting of the diaphragm plate and the regulator spring and off-side action.

Where the metal or rigid bearing surface connected with the valve element and opposed to the diaphragm is small, as it is in the illustrated embodiment of the invention, and it would be undesirable to provide the transmission or thrust element with a very large head, poor regulation results if the element bears against the rubber. This is because the rubber is not perfectly elastic but has plastic properties. What is desired of one of these regulators is to furnish the most uniform delivery pressure possible, notwithstanding that the high supply pressure falls. If the pin 23, for example, pressed against the rubber, the plasticity of this material would permit the pin to sink into the rubber gradually over a period of operation, with the result that a given operating or delivery pressure, for which the regulator had been set by the adjusting screw 30, would not be maintained.

This difficulty is avoided if the diaphragm is clamped between the diaphragm plate at the back of the diaphragm and a metal face piece at the front or the under side of the diaphragm, through a screw connection between these parts, this being a rather common construction. In that event, however, there must be a central opening in the rubber diaphragm, and not infrequently the clamping fails to keep the opening gas-tight. This defect is present also in regulators in which the valve mechanism is fastened to the diaphragm by a connection which passes through the diaphragm and depends upon clamping to keep gas from escaping through the hole.

In the present invention, the diaphragm 3 is permanently united to the diaphragm plate 5 by an interfacial bond. This introduces a different condition from those usually existing in known regulators, in which it has been customary either to have the diaphragm free from the diaphragm plate, in the sense of not being fastened to it, or to fasten the diaphrgam to the plate only at the center. Contrary to what might be expected, the absolute stiffening, as far as opportunity to flex is concerned, of so large an area of the diaphragm does not result in impaired regulation. I have ascertained by thorough tests that, with a large diaphragm plate, such as shown, united throughout to the diaphragm, the regulation obtained is of high quality. This is probably due in part to the fact that the diaphragm and plate act more like a piston. It will be observed that the diaphragm plate 5 is much larger in diameter than would be necessary if it were merely intended to serve as a seat for the inner end of the spring 6. This leaves only a narrow zone of flexible, unsupported rubber between the marginal region, which is fixedly held, and the area of the diaphragm which is bonded to the diaphragm plate. Though flexure is strictly confined to a comparatively narrow area of the diaphragm outside of the diaphragm plate, the properties of rubber such as used for regulator diaphragms have proved to be such that the diaphragm is quite capable of withstanding the stress in long continued service.

I have found that a very satisfactory method of permanently uniting the diaphragm and diaphragm plate in one composite article is to vulcanize the parts together. This is accomplished in a mold in which the rubber and the diaphragm plate are placed. The resulting bond has proved successful in tests and in actual service.

One advantage of this diaphragm and diaphragm plate unit is that the plate is at all times centralized, and can not rub on the spring case or shift so as to carry the regulator spring and the line of action on the transmission element of the valve to one side. In this aspect, the plan is applicable to regulators in which it is permissible for the transmission element to bear against the rubber.

The invention is further adapted for use in regulators in which it is important that the transmission element bear against a rigid, or non-plastic, part associated with the diaphragm. This is illustrated in the drawing, in which it is seen that the rubber diaphram has a central opening, so that the thrust pin 23 coacts with the diaphragm plate. Preferably, the diaphragm plate is made with a projection 31 on its under side to occupy the opening in the diaphragm. In either event, there need be no projection on the under side of the diaphragm, and by virtue of this the dimension of the regulator perpendicular to the diaphragm can be reduced as compared with a regulator having a clamping piece beneath the diaphragm, against which clamping piece the transmission element must act.

The projection 31 is shown as being equal to the thickness of the diaphragm, so that the under surface is flush. This projection might be omitted and still the pin 23 could bear against the plate 5, but the presence of the projection simplifies the problem of vulcanizing the rubber to the plate in a mold, without having the rubber fill up the opening in the diaphragm. It will be understood that when the article is taken from the mold there is apt to be some rubber over the face of the projection 31, usually as a mere skin or thin layer. This layer might be removed, but it is not necessary to do that because a slight thickness of rubber opposed to the pin 23 does not sensibly affect the action of the regulator. With this reservation, the contact between the diaphragm and the pin or other operating connection associated with the valve element is to be considered as being to all intents and purposes a metal to metal contact. A small pin will penetrate a skin of rubber and actually touch the diaphragm plate.

Another advantage of the construction that has been described is that, notwithstanding that there is an opening in the diaphragm, the radial extent of the bond between the diaphragm and the plate absolutely precludes a gas leak through the diaphragm. Experience has demonstrated that this seal remains tight under the stresses of operation for an indefinitely long time.

The regulator shown in the drawing is a single-stage regulator, but the invention is equally applicable to multi-stage regulators. Thus, either the chamber 14, which has been referred to as the high pressure chamber, or the chamber 15, which has been referred to as the low pressure chamber, may be an interstage chamber.

It will be evident that the form of embodiment of the invention may be varied, and it is, therefore, desired that the drawing and description be considered as being illustrative rather than limiting.

I claim:

1. In a gas pressure regulator wherein a diaphragm acted upon by the regulated gas pressure is interposed between a regulator spring and valve means coacting with an orifice; a diaphragm unit disposed in the stated relation and consisting of a rubber diaphragm clamped at its margin and a large, rigid diaphragm plate back of the diaphragm, between the same and the regulator spring, said diaphragm and diaphragm plate being permanently united by an interfacial bond which leaves only a narrow annular zone of the rubber diaphragm free to flex.

2. In a gas pressure regulator wherein a diaphragm acted upon by the regulated gas pressure is interposed between a regulator spring and valve means coacting with an orifice; a diaphragm unit disposed in the stated relation and consisting of a rubber diaphragm clamped at its margin and having a central opening, and a large, rigid diaphragm plate back of the diaphragm, between the same and the regulator spring, said diaphragm and diaphragm plate being permanently united by an interfacial, gas-tight bond which leaves only a narrow annular zone of the rubber diaphragm free to flex.

3. In a gas pressure regulator wherein a diaphragm acted upon by the regulated gas pressure is interposed between a regulator spring and valve means coacting with an orifice; a diaphragm unit disposed in the stated relation and consisting of a rubber diaphragm clamped at its margin and having a central opening, and a large, rigid diaphragm plate back of the diaphragm, between the same and the regulator spring, said diaphragm and diaphragm plate being permanently united by an interfacial, gas-tight bond which leaves only a narrow annular zone of the rubber diaphragm free to flex, in combination with a transmission element appurtenant to the valve means and bearing against the diaphragm plate at said opening in the rubber diaphragm.

4. In a gas pressure regulator wherein a diaphragm acted upon by the regulated gas pressure is interposed between a regulator spring and valve means coacting with an orifice; a diaphragm unit disposed in the stated relation and consisting of a rubber diaphragm clamped at its margin and having a central opening, and a large, rigid diaphragm plate back of said diaphragm, between the same and the regulator spring, said diaphragm and diaphragm plate being permanently united by an interfacial bond which leaves only a narrow annular zone of the rubber diaphragm free to flex, and said diaphragm plate having a portion occupying said opening in the diaphragm and substantially flush with the under side of the diaphragm, to coact with an element appurtenant to the valve means.

5. In a gas pressure regulator, the combination of a body having a reduced pressure chamber, an orifice through which gas from a region of higher pressure must pass to enter said chamber, a valve element coacting with the inlet side of said orifice, a thrust pin for unseating said valve element extending through said orifice into said reduced pressure chamber, a regulator spring, a diaphragm unit interposed between said spring and said reduced pressure chamber, said unit comprising a rubber diaphragm clamped at its margin and having a central opening, and a large diaphragm plate behind the diaphragm, between the same and the regulator spring, and permanently united to said diaphragm by an interfacial gas-tight bond which leaves only a narrow annular zone of the rubber diaphragm free to flex, said pin bearing against said diaphragm plate at said central opening in the diaphragm.

6. In a gas pressure regulator wherein a diaphragm acted upon by the regulated gas pressure is interposed between a regulator spring and valve means coacting with an orifice; a diaphragm unit disposed in the stated relation and consisting of a rubber diaphragm clamped at its margin and a large, rigid diaphragm plate back of the diaphragm between the same and the regulator spring, said diaphragm plate being vulcanized to the outer face of said diaphragm, leaving only a narrow annular zone of the rubber diaphragm free to flex.

7. In a gas pressure regulator wherein a diaphragm acted upon by the regulated gas pressure is interposed between a regulator spring and valve means coacting with an orifice, a diaphragm unit disposed in the stated relation and consisting of a rubber diaphragm clamped at its margin and a rigid diaphragm plate back of the diaphragm and coacting with the regulator spring, the face of said diaphragm plate being vulcanized to the outer face of the diaphragm and being large in diameter and the portion of the diaphragm which is free to flex being a relatively narrow annular zone.

GEORGE M. DEMING.